United States Patent
Srinivasan et al.

(10) Patent No.: US 6,872,486 B2
(45) Date of Patent: Mar. 29, 2005

(54) SCALABLE ALL-POLYMER FUEL CELL

(75) Inventors: Rengaswamy Srinivasan, Ellicott City, MD (US); Hassan M. Saffarian, Silver Spring, MD (US); Surya Raghu, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 150 days.

(21) Appl. No.: 10/110,436

(22) PCT Filed: Jul. 19, 2001

(86) PCT No.: PCT/US01/22746
§ 371 (c)(1),
(2), (4) Date: Apr. 11, 2002

(87) PCT Pub. No.: WO02/07242
PCT Pub. Date: Jan. 24, 2002

(65) Prior Publication Data
US 2002/0150804 A1 Oct. 17, 2002

Related U.S. Application Data
(60) Provisional application No. 60/219,371, filed on Jul. 19, 2000.

(51) Int. Cl.[7] .......................... H01M 8/24; H01M 8/10; H01M 4/86; H01M 4/96
(52) U.S. Cl. .............................. 429/38; 429/32; 429/40; 429/42; 429/44
(58) Field of Search ............................. 429/32, 38, 39, 429/40, 42, 43, 44

(56) References Cited

U.S. PATENT DOCUMENTS

| 3,880,670 | A | * | 4/1975 | Shinn .......................... 429/38 |
| 5,318,863 | A | | 6/1994 | Dhar |
| 5,470,671 | A | * | 11/1995 | Fletcher et al. ........... 429/40 X |
| 5,863,671 | A | | 1/1999 | Spear, Jr. et al. |
| 5,945,232 | A | * | 8/1999 | Ernst et al. .................... 429/32 |
| 5,989,741 | A | * | 11/1999 | Bloomfield et al. .......... 429/32 |
| 6,322,918 | B1 | * | 11/2001 | Kelley et al. ............. 429/38 X |
| 6,498,121 | B1 | * | 12/2002 | Gorer ....................... 429/40 X |
| 6,558,832 | B1 | * | 5/2003 | Bruck et al. .............. 429/38 X |

FOREIGN PATENT DOCUMENTS

| WO | 00/05775 | 2/2000 |
| WO | 00/30202 | 5/2000 |

* cited by examiner

Primary Examiner—Steven J. Kalafut
(74) Attorney, Agent, or Firm—Francis A. Cooch (57) ABSTRACT

A methanol-air fuel cell consisting of a stack of sub-fuel cells, each sub-fuel cell comprising a proton conducting polymer membrane, with each membrane having an array of 1-$cm^2$-anode unit cells on one side and an array of cathode unit cells on the other. A thin polymer film, with openings for the unit cells and plated with pre-patterned lines of electrical leads, is placed on each side of the membrane to collect the current from each unit cell. A polymer fuel-feed plate is placed on the thin polymer film on each side of the membrane to feed methanol and oxygen to the electrodes.

16 Claims, 6 Drawing Sheets

SCALABLE ALL-POLYMER FUEL CELL

CROSS-REFERENCE TO RELATED APPLICATION

This application claims the benefit of prior filed copending U.S. provisional application Ser. No. 60/219,371, filed Jul. 19, 2000.

BACKGROUND OF THE INVENTION

1. Field of the Invention

The present invention relates to fuel cells and, more specifically, is a novel design that results in a scalable, lightweight fuel cell with a low operating temperature.

2. Description of the Related Art

The emerging changes in consumer and defense electronics have generated a complex demand on power sources. Use of conventional batteries, fuel cells, and other power generators, such as internal combustion engines, heavily restrict the range and application of modern electronic devices. In the area of transportation, the national need for energy is growing, and fossil fuel reserves are shrinking.

Batteries and fuel cells, once thought of as ideal solutions to national energy and environmental needs, have not been able to meet any projected goals. For example, the zero-emission standard set by California was based on unrealistic expectations of current technology for both batteries and fuel cells. It is now known that California cannot realize its zero-emission goal with current technology. Furthermore, current discussions are not just about zero-emission, but developing alternate sources of energy to substitute for the depleting fossil fuels.

Unless a new technology is developed within the next few decades, the modus operandi for obtaining fossil fuels could become far more complex than today. Investment of resources in alternate energy sources including development of fuel cells that operate closer to their theoretical efficiencies is a good long-term plan.

The reasons for the popularity of the fuel cell include its potential to use renewable energy sources, its ability to produce non-polluting energy, and its high conversion efficiency and high (theoretical) energy density. Forty years of intense work on fuel cells have been largely confined to reengineering old ideas, which go back to the last century.

Fuel cells remain a top priority because of the unparalleled promise they hold. To break the barrier between promise and reality, the power and energy densities need to be boosted by a factor of three or more, the wasted heat needs to be eliminated, and the amount of platinum (Pt) loading must be reduced by three orders of magnitude (from 4 mg to 4 $\mu$g), or better yet, Pt should be replaced with a cheaper and more abundant material.

Fuel cells are power sources analogous to batteries. The major difference between the two is in the storage of fuel. In a fuel cell, the fuel is stored outside the reaction chamber, similar to gasoline used by an automobile engine. (In a battery, the fuel is stored internally.) Therefore, unlike a battery, fuel cells generate power for extended periods of time, limited only by the availability of the fuel. The success of a fuel cell for practical applications is determined by two factors: 1) the design of fuel storage outside the fuel cell and the delivery of the fuel into the cell; and 2) the efficiency of the reactions of the fuel and oxygen on the catalytic surfaces of the electrodes.

Figure 1:
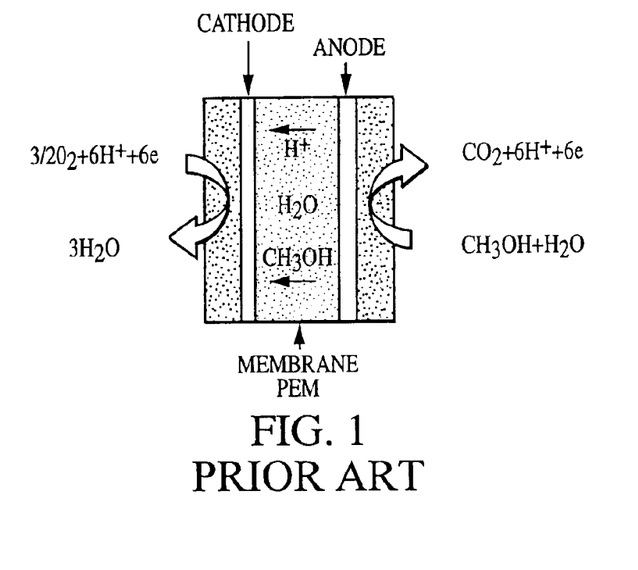
FIG. 1 illustrates the chemical reactions in a standard methanol-air fuel cell.

The most promising fuel for fuel cells that operate near room temperature is hydrogen. The most efficient storage medium for hydrogen is methanol. Therefore, the methanol-air fuel cell is the most popular of all fuel cells. Like all other fuel cells, the methanol-air cell generates electricity through two separate electrochemical reactions as shown below and in FIG. 1:

$CH_3OH + H_2O \rightarrow CO_2 + 6H^+ + 6e^-$ (at the negative terminal)

$3/2\, O_2 + 6H^+ + 6e^- \rightarrow 3\,H_2O$ (at the positive terminal)

In ordinary terms, methanol ($CH_3OH$) is oxidized at the anode and oxygen ($O_2$) in the air is reduced at the cathode to produce carbon dioxide ($CO_2$), water ($H_2O$) and electricity ($e^-$) or $CH_3OH + 3/2\, O_2 \rightarrow CO_2 + 2H_2O$. The reactions at the negative and positive terminals are conducted on special types of catalysts made from two relatively expensive metals, namely platinum(Pt) and ruthenium(Ru).

Figure 2:
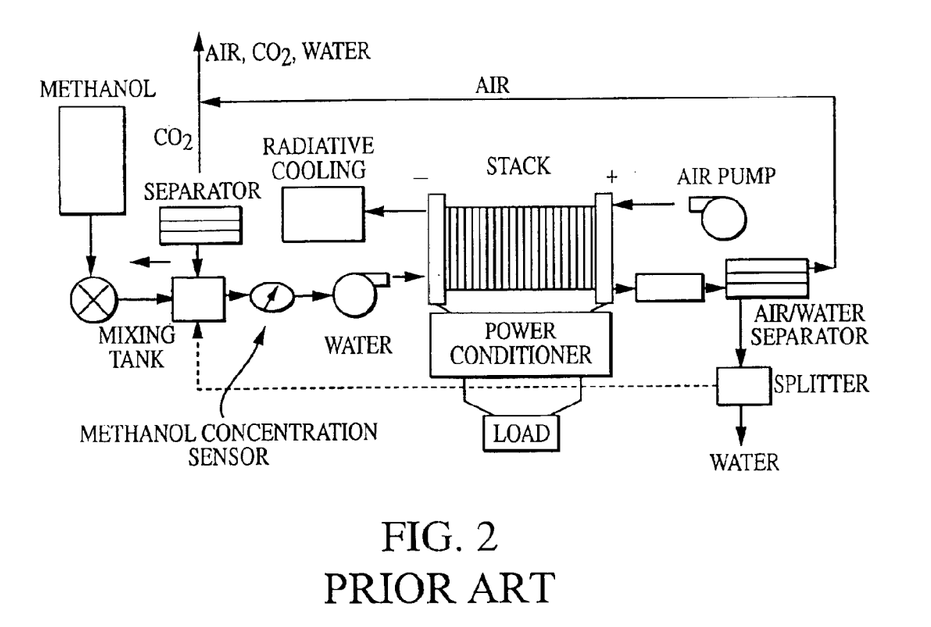
FIG. 2 is a schematic of a conventional methanol-air fuel cell.

FIG. 2 shows the conventional design of methanol-air fuel cells used in 5–100 W power generation. It is seriously limited by weight (33 g/W excluding the fuel), high operating temperature (100° C.), and high demand on the precious platinum (250 mg/W) and ruthenium (125 mg/W). However, if these limitations are overcome, a methanol-air fuel cell becomes one of the most attractive power systems because methanol has the single best storage capacity for hydrogen among all the hydrogen-based fuels.

The proton exchange membrane (PEM)-type methanol fuel cells use a proton conducting polymer membrane such as a NAFION®, a PFSA membrane, as the electrolyte. It is, as its name implies, a conductor of protons that are generated at the anode and consumed at the cathode. The PEM also allows the transport of water molecules that are generated at the cathode and partly consumed at the anode. In fact, for the NAFION® electrolyte to function as an effective electrolyte, it should always be kept hydrated. Unfortunately, the NAFION® membrane also transports methanol, whose molecules have similar physical properties as water.

Methanol crossover from the anode to the cathode has a depredatory effect on the oxygen cathode: methanol interferes with the oxygen reduction reaction, thus reducing the oxygen current and the fuel cell current. Methanol crossover can be partly alleviated by increasing the thickness of the NAFION® membrane, but this increases the internal resistance and, therefore, the internal resistive losses of the cell voltage. Increased internal resistance also increases the internal heat generated due to the current flow, which tends to dehydrate NAFION®, thus further contributing to the problem of heat generation.

NAFION®-117 is a compromise between the two opposing problems—resistance vs. methanol crossover—and is commonly used in fuel cells. In the absence of an alternative proton conducting polymer membrane to NAFION®, a methanol-tolerant oxygen cathode, a low current discharge, and a low operating temperature are the best alternatives to minimize internal polarization and methanol interference problems.

In the conventional design, one side of the NAFION® is coated with the cathode material and the other with the anode material. The cathode material is Pt powder on carbon support. The anode is a Pt-Ru powder (50% atomic ratio of platinum and ruthenium), also on carbon support. The Pt-loading on both electrodes is on the order of 1–10 mg/cm$_2$. One carbon cloth placed on the top of each electrode provides a passage to the fuel (3% solution of methanol in water to the anode) and air (oxygen to the cathode). The carbon cloth also provides the electrical contacts to the electrodes.

On the top of the carbon cloth is a plate, also known as the "bi-polar" plate, that feeds both methanol and air into the fuel cell. Each plate is made from two sheets of machined graphite or titanium, held together by an electrically insulating material. One side is placed on a carbon cloth that is attached to anode-side (negative terminal) of a NAFION® membrane, and the other to the cathode-side (positive terminal) of yet another NAFION® membrane. Several such combinations of anode-NAFION®-cathode, sandwiched between carbon cloths and bi-polar plates are stacked to form a fuel cell.

As noted above, most conventional fuel cells are operated at about 100° C. with the minimum operating temperature of a fuel cell that also generates a useful amount of current being 60° C. At the 60° C. temperature, the cell generates about 200 mA/cm$^2$, with a manageable degree of dehydration. Some fuel cells actually operate at much higher temperatures—some at 130° C.—if water can be carried in great abundance along with the fuel cell to re-hydrate the membrane. Yet, the fuel cell voltage is far from its theoretical value—0.4 V vs. 1.2 V—a loss of more than 0.8 V, mostly due to internal polarization. This difference manifests itself as internal heat, which is further compounded by the increasing resistance of the NAFION membrane at higher temperatures.

As a result of internal polarization and resistive heating, the fuel cell loses about two thirds of all the energy that it produces. To dissipate this heat, conventional designs use fans and radiators, which add to the weight of the fuel cell when, in principle, the weight of a fuel cell should not exceed the weight of the stack+fuel+fuel storage system. In fuel cells that generate 10W or more power, the weight of the accessories easily exceeds the weight of the stack.

Furthermore, the stack cannot tolerate more than a 3% wt. of methanol solution in water as the fuel. That means, 97 grams of water should be added to every 3 grams of methanol, although only 1.69 grams of water participates in the reaction. Most fuel cell systems store and feed the fuel in the 3% wt. form, under the assumption that the excess water is utilized to hydrate the (NAFION®) electrolyte. The result of the additional water and accessory requirements is a heavy fuel cell that is only able to produce a power of 33 W/kg. This power density is paltry when compared with its theoretical power density of 2,413 W/kg, and the power densities of batteries at 75–100 W/kg.

Additionally, if the present practice of platinum "loading" of the catalyst (4 mg/cm$^2$) continues, then the cost of the fuel cell will remain prohibitively high. It is unlikely to be a ubiquitous source of power, or used with disposable, field-deployable sensors and unmanned vehicles. Besides, at the 4-mg/cm$^2$ level of loading, there will not be enough platinum left for its use as a catalyst in any large-scale operation.

The list of limitations of methanol-air fuel cells, based on conventional designs, can be summarized as follows:

Methanol interference on the cathode minimizes oxygen current, therefore, the cell current.

High temperature ($\geq 60°$ C.) is necessary to generate 200 mA/cm$^2$, but this contributes to methanol crossover and NAFION® dehydration.

High temperature operation demands the availability of excess water and requires fans and radiators to dissipate heat, which add to the weight of the fuel cell.

Fuel-feed bi-polar plates are machined from graphite or titanium, which is one major source of weight. A lightweight alternative is not yet used in fuel cells of 20 W or higher power.

High internal resistance and polarization losses generate >100 W heat in a 20 W fuel cell, most of which is wasted through radiation.

The concentration of methanol inside the fuel cell can only be about 1 M (3% solution in water). Most fuel cells also use the same methanol/water ratio in the storage. That means, to generate 20 W continuous power for 3 days will require 2.5 kg of the fuel.

High platinum "loading" results in a prohibitively high cost for the fuel cell.

All of these limitations make a methanol-air fuel cell based on conventional designs unattractive.

SUMMARY OF THE INVENTION

The invention comprises a scalable, all-polymer methanol-air fuel cell that is far more efficient and lightweight than its conventional (heavyweight) counterpart. It is a unique, high energy, high power fuel cell that has a sufficiently low internal operating temperature that external cooling devices are not required.

The invention is an easily scaleable design that will generate 1 to 100 W and weigh 6–7 g/W and can be geometrically scaled up or down to meet custom power needs for a multitude of applications. The scalability will allow production of fuel cells to power MEMS-type devices, robots, UAVs, UUVs, satellites/spacecrafts, and armored vehicles. The design is so simple that the output of a 1.4 W unit can be changed from 0.55 V at 2.5 A to 14 V at 0.1 A, by changing only two thin polymer (MYLAR® polyester film) films. The invention will operate at 35° C. and use less than 100 mg/W of platinum and 50 mg/W of ruthenium.

Figure 3:
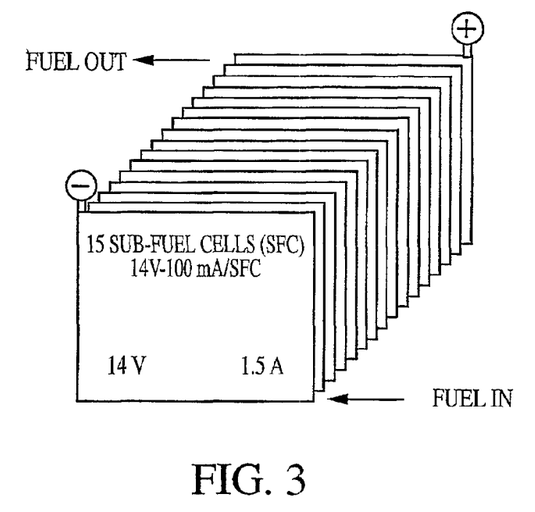
FIG. 3 is a schematic of a 21 W embodiment of the all-polymer methanol-air fuel cell of the invention.

The fuel cell design of the invention represents a dramatic change in fuel cell technology. This approach is also amenable to a hybrid power system design, i.e., combine the fuel cell with a rechargeable battery to achieve short-term high current needs with long term low power efficiencies. The embodiment shown in FIG. 3 is a 21 W unit, weighs 126 grams excluding the fuel, and can be used for applications ranging from laptop computers to television monitors.

The basic operating principle of the invention is to generate electrical power at low currents and higher voltages. In the 21 W embodiment, the total current output will be 1.5 A, generated from 15 sub-fuel cells arranged in parallel. Each sub-fuel cell will generate only 100 mA, which is two orders of magnitude lower than conventional designs. Low current generation limits internal resistive heating, eliminating the need for active heat dissipation. This low current density also minimizes polarization and allows for a relatively high cell voltage. The fuel cell also incorporates novel catalyst combinations.

The fuel cell of the invention will consist, in one embodiment, of 30 polymer fuel-feed plates, with one proton conducting polymer membrane, such as NAFION®-117, placed between each set of 2 plates, for a total of fifteen membranes. Each plate is comprised of an array of 25 1-cm$^2$ anode or cathode unit cells. Each NAFION®-117 membrane will be coated with 25 1-cm$^2$ Pt-Ru anode unit cells on one side and an equal number Pt cathode unit cells on the other. A thin polymer film, e.g. MYLAR®, plated with pre-patterned lines of leads, such as gold, will be used to collect the current from each side of the membrane. The polymer fuel-feed plates will be molded from, e.g., phenolic resin or polychlortrifluoroethylene, with millimeter channels to feed the fuel and to remove the reaction products.

Computational fluid dynamic (CFD) models ensure that the multiphase phase (water, methanol, $CO_2$), low Reynolds number flow is optimized for the existing micro-pumps. The CFD tool will be used (1) to assure that accumulation and blockage of $CO_2$ does not occur and (2) to act as a design guide for geometrical changes and re-scaling to other applications.

The Pt catalyst has been modified with organic additives to increase the oxygen and the cell current and minimize methanol interference. The morphology of the catalyst has also been changed.

Furthermore, in the invention, methanol will be stored as 80% mixture and be fed at 3% concentration into the fuel cell using sensors and valves for dilution. (Inside the fuel cell, methanol crossover is a major problem, if its concentration exceeds 3%.) This arrangement of diluting and adding methanol as required from 80% storage provides more than three times the benefit in the weight of the fuel required. As mentioned earlier, methanol has the highest storage capacity for hydrogen than any other fuel, including pressurized hydrogen. Conventional designs lose this advantage, as they cannot avoid carrying it at the 3% level, due to their great demand for water. The invention eliminates high demand for water, permitting use of a smaller weight of the stored fuel. The water that is produced in the cathode will be utilized to dilute the stored fuel to retain the 3% ratio inside the fuel cell.

In summary, the design of the proposed 21 W embodiment of the all-polymer fuel cell of the invention differs in a number ways from those of conventional methanol-air fuel cell in the similar power category:

It will be small modular, scaleable and conforming, and weigh between 96 and 197 grams;

It will operate at 35° C. instead of 60° C. The low-temperature operating has several advantages. It eliminates the demand for excess water, fans and radiators to dissipate heat, thus doing away with a large part the excess weight of the fuel cell. It minimizes methanol crossover and NAFION® dehydration;

It will discharge at 100 mA/cm² instead of 200 mA/cm². The low current density discharge reduces the internal polarization by 150 mV;

Use of all-polymer fuel-feed bi-polar plates instead of machined graphite or titanium helps shed $\frac{2}{3}^{rd}$ of the stack weight;

Pt catalyst modified with organic additives increases the oxygen and the cell current and minimize methanol interference;

The invention will use a 3% methanol in water as the fuel. However, it will draw the fuel from a stock of 80% methanol. The low current generation (100 mA/cm²) provides sufficient time to monitor the concentration of methanol inside the cell, and add methanol from an 80% concentrate. The advantage of the invention over a conventional design is the lower amount (and, hence, weight) of fuel stock required.

BRIEF DESCRIPTION OF THE DRAWINGS

FIG. 4, consisting of FIGS. 4A and 4B, illustrates respectively, a cross-sectional view of a single 1-cm² unit cell, and a schematic of a 25-unit sub-fuel cell with electrical contacts.

DETAILED DESCRIPTION

While the invention will now be described in the context of a 21 W embodiment thereof as shown in FIG. 3, the use of this embodiment is intended to be illustrative only. One of ordinary skill in the art can readily scale the described embodiment to achieve less or more power; the use of this specific 21 W embodiment is not intended in any way to limit the scope of the concept of the present invention.

Figure 4A:
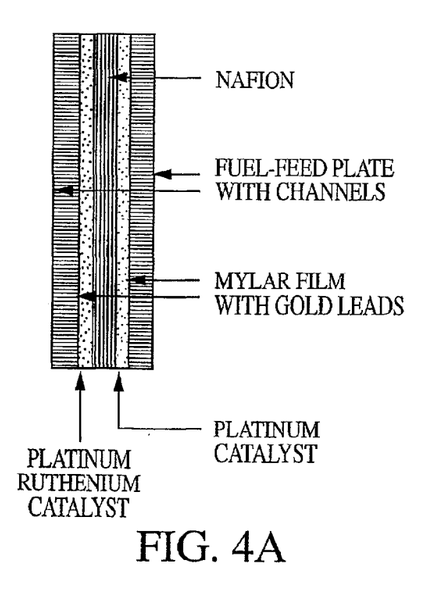
Figure 4B:
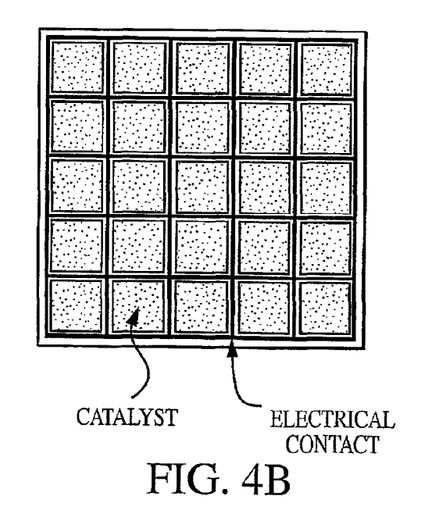

The basic operating principle of the fuel cell of the invention is to generate power with a low current and a slightly higher unit cell voltage. This is achieved by introducing a small-size building block approach to construct the fuel cell. As shown in FIG. 4A in a cross-sectional view, the building blocks are small unit cells of 1-cm², producing 0.55 V at 100 mA. There will be 25 such unit cells in each sub-fuel cell plate, as shown in FIG. 4B, connected in series to produce 14 V at 100 mA.

As shown in FIG. 3, fifteen of these sub-fuel cell plates will operate in parallel to form the fuel cell that will generate 14 V at 1.5 A or 21 W. This provides the proper conditions to charge a battery, which is assumed to be discharged at 12 V and 1.667 A (or 20 W) on average. Note that DC/DC conversion has been avoided by the selection of the sub-fuel cell plate geometry. Given a different application, then the sub-fuel cell can be reconfigured to meet those needs.

Each sub-fuel cell will consist of a proton conducting polymer membrane, such as NAFION®-117, which plays the role of the electrolyte, see FIG. 4A. The membrane will have an array of 25 1-cm²-anode unit cells on one side and an equal number of cathode unit cells on the other, as shown in FIG. 4B. The electrodes will be coated with Pt-Ru (anode) and Pt (cathode) catalysts. A thin polymer film, for example, MYLAR®, with 25 openings, one opening for each unit cell, and plated with pre-patterned lines of electrical leads, such as, for example, gold, will be placed on each side of the membrane to collect the current from each unit cell.

Figure 5:
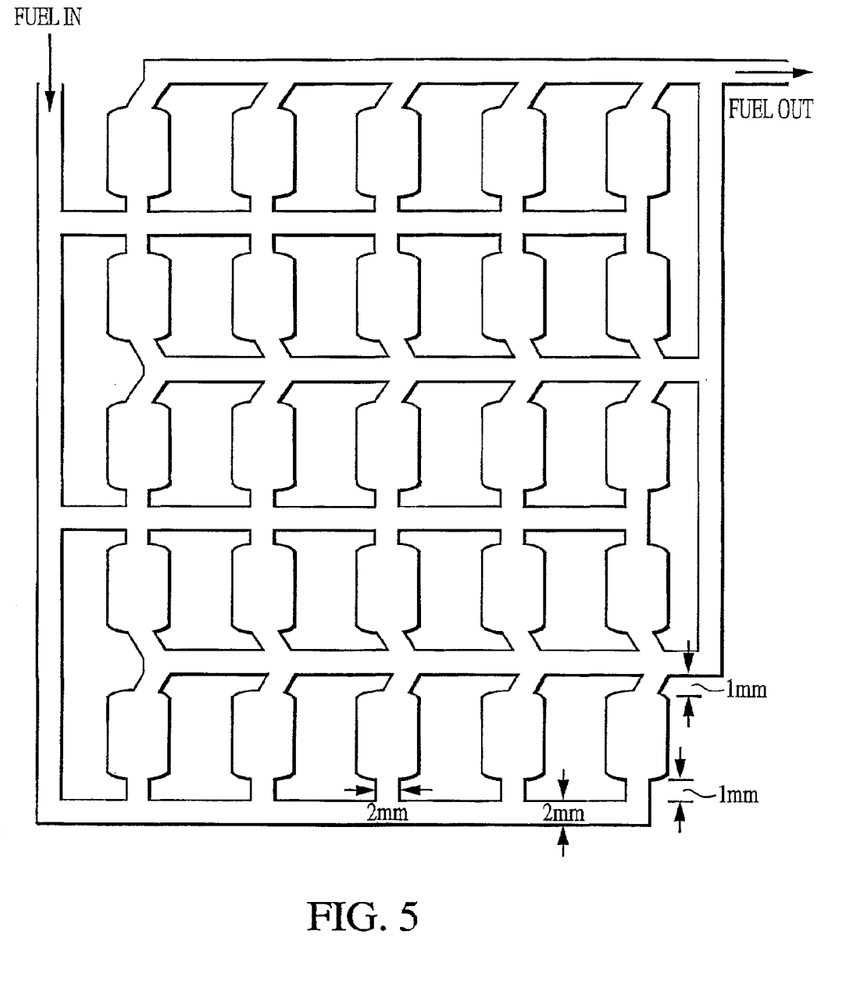
FIG. 5 is a schematic of a fuel-feed plate for a sub-fuel cell with 25 unit cells and millimeter channels for the fuel input and product output.

As shown in FIG. 5, each fuel-feed plate will contain 25 spaces or volumes to match the unit cell anodes/cathodes on the NAFION® membrane. Millimeter-size channels will feed methanol (anode)/air (cathode) into those unit cells and will allow for the out-flow of the reaction products.

Polymers, such as phenolic resins, will be used as the fuel-feed plate material. Phenolic resins are amenable to molding, which is easier than machining graphite plates that are used in conventional designs. The density of phenolic resin is only $\frac{1}{3}^{rd}$ of graphite, which dramatically reduces the weight of the fuel cell. Machined polychlortrifluoroethylene (PCTFE-known commercially as Kel-F) can be used as an alternative to molded phenolic resin.

The cast for molding the fuel-feed plate will be made only after the design of flow patterns are optimized using computational fluid dynamics (CFD) multi-phase low Reynolds Number simulations as a guide. FIG. 5 shows the schematic of the fuel-feed plate with 25 unit cells and millimeter channels. Each fuel plate will be 0.15-cm thick, and will feed methanol and oxygen to the electrodes. The unit cell will be 0.5-mm deep, and the channel width and depth 1–2 mm. The methanol solution and air will be pumped into the cell using two 3×3×2-cm pumps. The flow rate of the fuel will be less than 0.005 cc/s/cell or 2.0 cc/s for entire sub-fuel cell.

The 2 fuel-feed plates +1 NAFION® membrane +2 MYLAR® films form a sub-fuel cell plate. Each plate will be 8×8×0.15-cm (9.6 cc). Assuming a polymer density of 0.71 g/cc, and after discounting the space removed for the cells and the channels, the weight per plate will be 5.9 grams. Two such plates per sub-fuel cell will weigh 11.8 grams. The fuel inside each sub-fuel cell will add 1.3 grams to the weight. Thus, each sub-fuel cell will be 8×8×0.4 cm (25.6 cc) in dimension, and 13.1 grams in weight for the 21 W embodiment of the invention.

These sub-fuel cells can be arranged in two different ways to form a 21 W fuel cell stack, and the exact arrangement will affect the net weight of the fuel cell. In a fairly simple arrangement, 15 sub-fuel cells will be arranged to form a stack that weighs 197 grams. In this case, each sub-cell is an independent or a modular fuel cell as shown in FIG. 4A.

In an alternative arrangement, which is a monolithic design, both sides of the fuel-feed plate will be machined, one side to feed methanol, and the other air. In the latter arrangement, there will be 16 plates that will hold 15 NAFION® membranes, for a total stack weight of about 96 grams.

The weight of the polymer tubes (10 grams), the 2 micro-pumps (5 grams each), the methanol sensors (5 grams), fins to radiate heat (10 grams) and electronics for impedance matching between fuel cell and battery (5 grams) should be added to the weight of the power system. The net weight of the 21 W (14 V; 1.5 A) fuel cell is expected to be about 227 grams (modular design), or 126 grams (monolithic design).

The single critical element in the invention that distinguishes it from the conventional designs is the generation of only 100 mA/cm$^2$ (100 mA/block) and 100 mA per sub-fuel cell. In contrast, conventional designs operate at twice the current density, namely, 200 mA/cm$^2$. Operating at a lower current allows the polarization of the cell to be lowered to 600 mV vs. 800 mV in conventional designs. It allows cell operation at lower temperatures of 35° C. vs. 60° C. in conventional designs, thus minimizing NAFION® dehydration enormously. Lower current also minimizes internal resistive heating losses significantly. The 21 W embodiment of the fuel cell will generate 14 W of heat, which will be easily dissipated without the need for fans and radiators. It will also eliminate the potential for the dehydration of the NAFION® membrane. In contrast, a 20 W conventional fuel cell would generate more than 100 W equivalent of heat, which is the source of most thermal and water management problems.

In addition to exploiting the fluid dynamics of the cell, the invention incorporates two modifications to improve catalyst performance through the use of organic additives and tailoring the surface morphology.

Many simple but highly stable organic compounds can be added in small quantities (milligrams) to (i) accelerate oxygen reduction and to (ii) minimize methanol interference on the oxygen electrode. One example of such additives are uracil and its derivatives, which decrease the electrode polarization by 25 to 50 mV, thus increasing the cell voltage by the same amounts.

On the cathode (Pt), several monolayers of 5-ethyl uracil (5-EU) can be absorbed. The adsorbed organic additive increases the cathodic current and keeps the overpotential to a low value. In addition, it also prevents methanol (that crosses over from the anode to the cathode through the NAFION® membrane) from adsorbing to the cathode. Thus, it prevents methanol oxidation on the cathode. (This action is similar to minimizing the methanol crossover problem, without requiring special membranes.) Either way, the organic additive improves the performance of the oxygen cathode, as well as the performance of the fuel cell. (See "Effect of Organic Additives on Oxygen Reduction on Pt Catalysts," Saffarian, H. M., Srinivasan, R, Chu, D., and Gilman, S., Proceedings of the 39$^{th}$ Power Sources Conference, 1999, pp. 116–119; "Effect of adsorbed uracil and its derivatives on the rate of oxygen reduction on platinum in acid electrolytes," Saffarian, H. M., Srinivasan, R., Chu, D., and Gilman, S., *Journal of Electroanalytical Chemistry,* 504(2001) 217–224; and "Acceleration of Oxygen Reduction Rate by Alkyl Derivatives of Uracil on Pt Catalysts used in Fuel Cells," Saffarian, H. M., Srinivasan, R., Chu, D., and Gilman, S., *Journal of the Electrochemical Society,* 148 (6) A559–A564 (2001) all three publications being incorporated herein by reference.).

Figure 6:
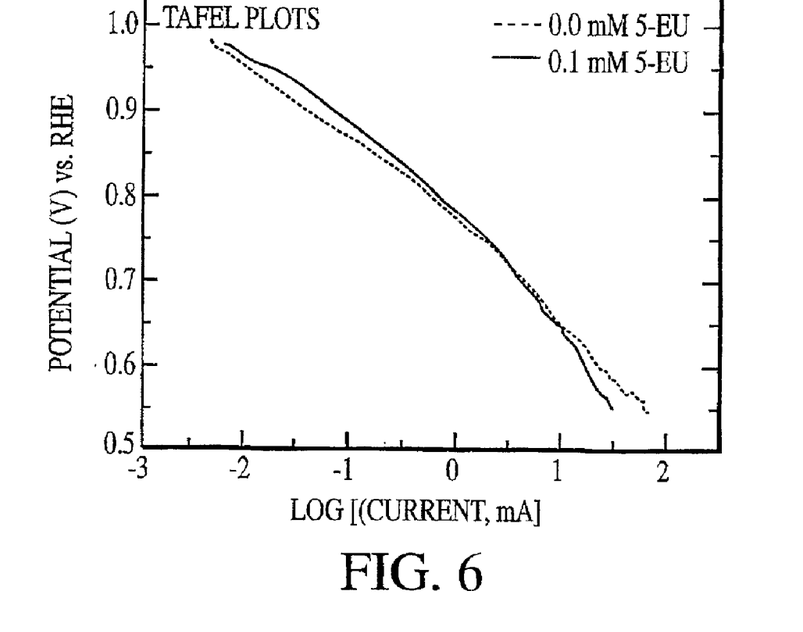
FIG. 6 illustrates a Tafel plot of the current (I) vs. potential (E) for oxygen reduction on a smooth platinum electrode, with and without the adsorbed 5-EU.
Figure 7:
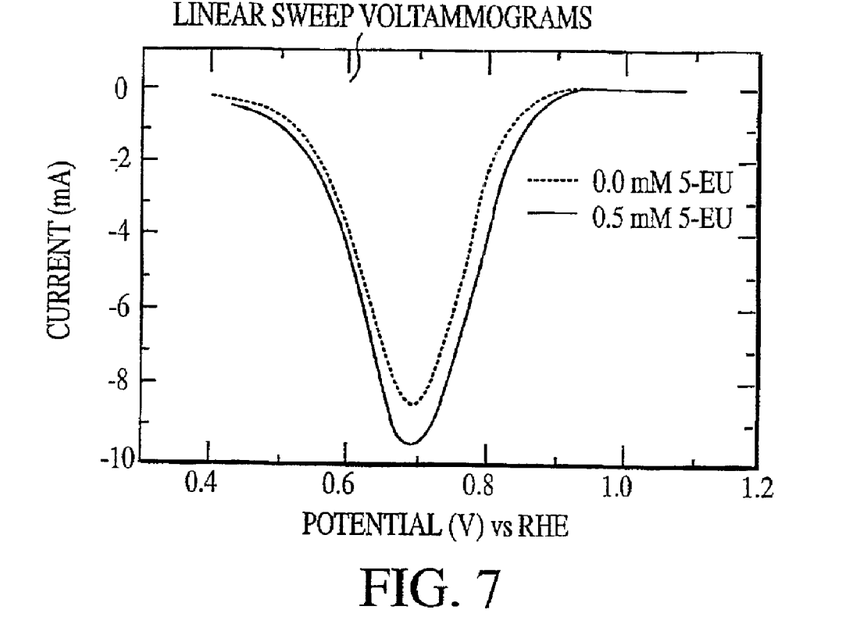
FIG. 7 illustrates a plot of current vs. potential (linear sweep voltammetry) similar to FIG. 6 for a platinum catalyst made from platinum black (particle size: 1.5 nm), bound by NAFION® on a carbon-cloth electrode.
Figure 8:
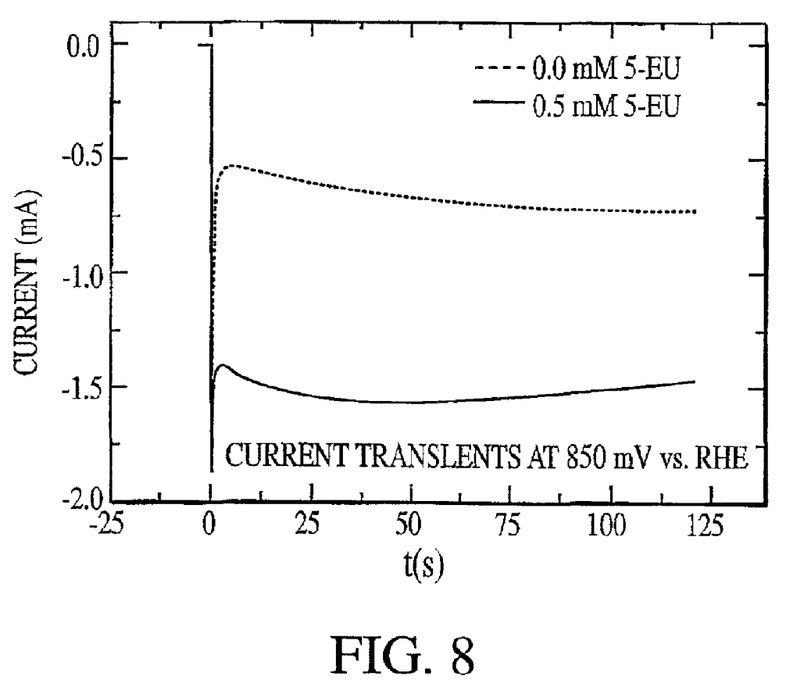
FIG. 8 illustrates a set of current-time (I-t) transients that demonstrates the beneficial effects of the organic molecule on oxygen reduction.

FIG. 6 plots the current (I) vs. potential (E) (Tafel plots) for oxygen reduction on a smooth platinum electrode, with and without the adsorbed 5-EU. Note that at higher potentials applicable to fuel cells, the currents are significantly higher in the presence of the organic. FIG. 7 shows a similar set of I vs. E (linear sweep voltammetry) plots on a Pt catalyst made from platinum black (particle size: 1.5 nm), bound by NAFION® on a carbon-cloth electrode. A set of current-time (I-t) transients shown in FIG. 8 also demonstrates the beneficial effects of the organic molecule on oxygen reduction. 5-EU is a stable molecule, and is not reduced or oxidized on Pt within the operating potential of the fuel cell. The reason for the beneficial effect of the 5-EU (and many other derivatives of uracil) include higher oxygen solubility at the interface of the Pt/electrolyte in the presence of the 5-EU and partial charge transfer.

In addition to the use of an organic additive, the efficiency of the catalysts can be increased by altering its morphology. There is a strong relationship between the fractal dimension ($D_f$) of the electrode and the reaction rate. Fuel cell electrodes prepared using conventional techniques are not optimized to utilize all the catalysts and the surface area. The invention optimizes the area utilization by restructuring the surface morphology of the electrode.

In the past, Pt catalyst for oxygen reduction, for example, has been developed based on two primary properties. First, Pt was identified as the substrate on which oxygen reduction encountered the least activation energy, especially at temperature >60° C. Second, the surface area of Pt was increased by ×6000 by using Pt nanoparticles to form the catalyst. This classical approach, however, becomes counterproductive: the small activation energy drives the rate of the reaction into diffusion limit, which forces the diffusion layer well away from the surface of the catalyst resulting in the loss of surface area. Under these circumstances, the area available for the reaction drops by two orders of magnitude. In order to utilize all of the area, it is critical to understand the interplay between activation energy, diffusion, and the catalyst dimension.

Figure 9:
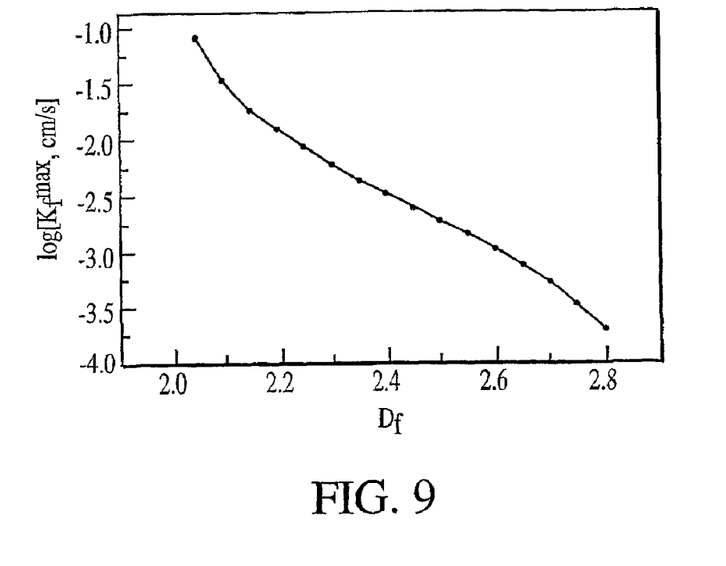
FIG. 9 illustrates the $k_f$ at which Q (see FIG. 10) reaches a maximum with $D_f$. The $k_f$ for oxygen reduction on Pt is about $1\times10^{-2}$ cm/s. The $D_f$ for conventional Pt catalyst is about 2.4. A less active catalyst ($k_f=1\times10^{-3.5}$ cm/s) with $D_f=2.8$ will provide higher Q, thus more efficient utilization of oxygen.

Recent studies on the fractal properties of electrochemical systems show that a monotonic increase in Pt loading or the surface area of catalyst does not produce a desired increase in the reaction rate (or cell current). On the contrary, it is better to use smaller Pt loading and increase the dimensionality of the electrode to achieve larger current from the cell. The effect of reduced catalyst availability on increased current has been recently demonstrated through laboratory experiments using Pt catalyst for oxygen reduction. (See "Acceleration of Oxygen Reduction Rate by Alkyl Derivatives of Uracil on Pt Catalysts used in Fuel Cells," Saffarian, H. M., Srinivasan, R., Chu, D., and Gilman, S., *Journal of the Electrochemical Society*, 148 (6) A559–A564 (2001) which is incorporated herein by reference.) FIG. 9 illustrates the $k_f$ at which Q (see FIG. 10) reaches a maximum with $D_f$. The $k_f$ for oxygen reduction on Pt is about $1 \times 10^{-2}$ cm/s. The $D_f$ for conventional Pt catalyst is about 2.4. A less active catalyst ($k_f=1 \times 10^{-3.5}$ cm/s) with $D_f=2.8$ will provide higher Q, thus more efficient utilization of oxygen.

As noted above, a key contribution to the performance of fuel cells is the roughness and dimension of the catalyst. A model has been derived that relates the electrode dimension ($D_f$) to the rate of the reaction ($k_f$) that is related to the activation energy ($\Delta G$) (see FIGS. 9 and 10). The model suggests that if $D_f$ is increased (as a means to increase the surface area) in order to increase efficiency of the fuel cell reaction, then $k_f$ should be kept small, and $\Delta G$ should be increased. Note that in the conventional approach, $D_f$ is increased and $\Delta G$ is decreased to increase the efficiency. In other words, the operating temperature should go down to about 35° C., and the Pt loading should decrease substantially, without loss of dimensionality of the catalyst. Alternatively, a less active material that is less noble (and less scarce) than Pt may be used as the catalyst.

For similar $\Delta G$ reasons, we may be able to use ethanol instead of methanol as the fuel. In the past, ethanol has not been used as a fuel in fuel cells due to the higher $\Delta G$ associated with its oxidation (than the $\Delta G$ associated with methanol oxidation). Tailoring the electrode with appropriate $D_f$ may change the argument in favor of ethanol as the fuel.

Figure 10:
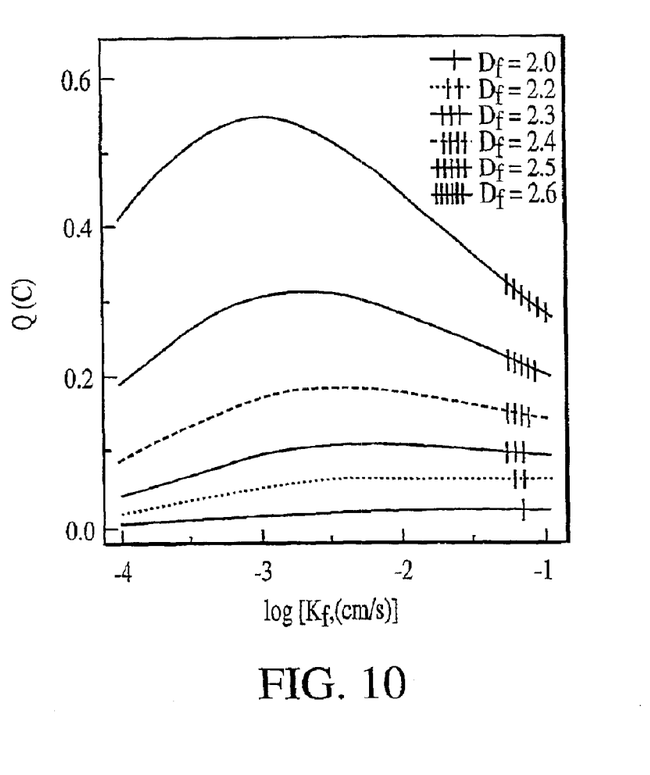
FIG. 10 illustrates variation in the charge (Q) (due to oxygen reduction) with rate constant ($k_f$) at different $D_f$. Higher the Q means better the fuel cell performance.

The fractal dimension of the Pt catalyst used in "Effect of Organic Additives on Oxygen Reduction on Pt Catalysts," Saffarian, H. M., Srinivasan, R., Chu, D., and Gilman, S., Proceedings of the 39th Power Sources Conference, 1999, pp. 116–119, incorporated herein by reference, was 2.4. At that potential, the best oxygen reduction current is obtained at $2.56 \times 10^{-2}$ cm/s, not at $2.6 \times 10^{-3}$ cm/s, which is the experimental rate constant, $k_f$ for oxygen reduction at 0.75 V(vs. RHE). FIG. 10 illustrates variation in the charge (Q) (due to oxygen reduction) with rate constant ($k_f$) at different $D_f$. Higher the Q means better the fuel cell performance. FIGS. 9 and 10 also suggest that desired $D_f$ for oxygen reduction is about 2.7, where maximum reduction of oxygen can be realized. The technique used to prepare the Pt catalyst is similar to the techniques used in making catalysts by commercial and military organizations. The gap between $D_f$ and $k_f$ will continue to be closed to optimize the current generated by the fuel cell.

Because the relationship between the catalyst dimension and the activation energy cannot be predicted, the Pt catalyst can be tailored to the desired activation energy by mixing it with a less active material such as carbon, i.e., the dimensionality of the electrode can be varied by changing the amount of the carbon support, without increasing the amount of Pt. It is likely that the amount of Pt-loading can be far less than the conventional 1–4 mg/cm², and still provide 100 mA/cm² at 35° C. The efficiency of the reaction will be improved through optimization of the fractal dimension viz. a viz. reaction rate of oxygen reduction and methanol oxidation.

The intended fuel for the fuel cell of the invention is 80% methanol-water mixture. This ratio is determined based on the consideration that only 0.175 µL of the 3% methanol solution is consumed every second. This amounts to a total consumption of less than 0.1% of the 3% solution every second. By adding a few drops of the stock solution, and a part of the water generated at the cathode, we can easily maintain the methanol concentration over 3 or 10-day periods from 80% stock solution. For a 3-day period, the fuel weight will be 625 g, and the volume 0.625 L. For a 10-day period, the weight will be 2.1 kg, and the volume 2.1 L. This mixture will supply continuously 20 W of power for the duration of the period. The methanol solution and air will be pumped into the cell using two 3×3×2-cm pumps. The flow rate of the fuel will be 0.005 cc/s/cell or 2.5 cc/s for the entire fuel cell.

The 21 W embodiment of the invention improves upon the conventional designs in several different ways:

The use of 25 individual unit cells in series. Such a design eliminates water and thermal management issues.

The total current produced by the fuel cell will not exceed 100 mA, which allows the operating temperature to be at 35° C. Low current discharge minimizes polarization losses at the anode and cathode, thus keeps the cell voltage around 0.55 V.

The low current operation minimizes internal heat generation, thus eliminating the need for fans and radiators. The 14 W heat generated by the system will be utilized to maintain the temperature around 35° C.; any excess heat will be removed by the circulating fuel and radiated into the atmosphere through fins.

At 35° C., the dehydration of NAFION is at its minimum. Water present in the 3% methanol/water solution, and those generated at the cathode will sufficiently hydrate the membrane. No additional storage of water will be necessary to hydrate the membrane.

Polarization losses will be minimized through the use of organic additives to the cathode. It has been shown that several derivatives of uracil accelerate oxygen reduction on Pt catalyst. They also prevent adsorption of methanol on the cathode, thus methanol interference with oxygen reduction.

To generate 21 W power at 100 mA (at 35° C.), the fuel cell of the invention will have 375 individual cells. Each cell will have 1 cm² in area, and produce 0.55 V at 100 mA, for a total of 15 V; through a voltage follower for impedance matching, the output of the fuel cell can be used directly to charge a battery. In contrast, conventional designs use about 10 cells, each about 25 cm², and each cell produces about 0.4 V at 200 mA/cm², for a total of 4V and 5 A. Generation of 200 mA/cm² is not possible at 35° C., but generation of 100 mA/cm² is rather easy, which is an important advantage of the design.

We claim:

1. A sub-fuel cell comprising:

a plurality of unit cells, comprising anode unit cells and cathode unit cells;

a proton conducting polymer membrane, the anode unit cells being placed on one side of the membrane and the cathode unit cells being placed on the other side of the membrane opposite the anode unit cells;

a polymer film having a thickness sufficient to support electrical leads being placed thereon and having openings for the anode and cathode unit cells and having electrical leads placed thereon, one of the polymer film being placed on each side of the proton conducting polymer membrane and around the anode unit cells and the cathode unit cells to collect electric current from each unit cell; and two feed plates having spaces corresponding to the anode unit cells and the cathode unit cells and interconnecting channels for supplying fuel to the anode unit cells and oxidant to the cathode unit cells, one feed plate being placed on the side of the polymer film having the anode unit cells and one feed plate being placed on the side of the polymer film having the cathode unit cells.

2. A fuel cell comprising a plurality of sub-fuel cells as recited in claim 1, the plurality of sub-fuel cells being stacked together to form the fuel cell.

3. The fuel cell as recited in claim 2, wherein each feed plate has spaces and interconnecting channels on both sides of the plate thereby allowing one feed plate to provide fuel to two adjoining sub-fuel cells.

4. The sub-fuel cell as recited in claim 1, wherein the anode unit cells are coated with platinum and ruthenium and the cathode unit cells are coated with platinum.

5. The sub-fuel cell as recited in claim 1, wherein the polymer film is plated with pre-patterned lines of electrical leads.

6. The sub-fuel cell as recited in claim 5, wherein the electrical leads are gold.

7. The sub-fuel cell as recited in claim 1, wherein the feed plates comprise a polymer.

8. The sub-fuel cell as recited in claim 7, wherein the polymer is a phenolic resin.

9. The sub-fuel cell as recited in claim 7, wherein the polymer is polychlortrifluoroethylene.

10. The sub-fuel cell as recited in claim 4, wherein an organic compound is added to the platinum.

11. The sub-fuel cell as recited in claim 10, wherein the organic compound is uracil.

12. The sub-fuel cell as recited in claim 10, wherein the organic compound is a derivative of uracil.

13. The sub-fuel cell as recited in claim 4, wherein the fractal dimension of the platinum is increased to about 2.7.

14. The sub-fuel cell as recited in claim 13, wherein the fractal dimension is increased by mixing the platinum with a less active material.

15. The sub-fuel cell as recited in claim 14, wherein the less active material is carbon.

16. The sub-fuel cell as recited in claim 1, wherein the sub-fuel cell uses an 80% by weight methanol-water mixture diluted to 3% concentration as fuel.

* * * * *